United States Patent
Smyth et al.

(10) Patent No.: US 10,412,581 B2
(45) Date of Patent: Sep. 10, 2019

(54) SECURE SESSION COMMUNICATION BETWEEN A MOBILE DEVICE AND A BASE STATION

(71) Applicant: Ford Global Technologies, LLC, Dearborn, MI (US)

(72) Inventors: Cameron Smyth, Wyandotte, MI (US); Robert James Southern, Madison Heights, MI (US); John Robert Van Wiemeersch, Novi, MI (US); David Ray Erkkila, Brighton, MI (US); Mike Raymond Westra, Plymouth, MI (US); Aldi Caushi, Northville, MI (US); John William Turner, Gregory, MI (US); Bobak Shahidehpour, Ann Arbor, MI (US); Vivekanandh Elangovan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 248 days.

(21) Appl. No.: 15/432,886

(22) Filed: Feb. 14, 2017

(65) Prior Publication Data

US 2018/0234843 A1 Aug. 16, 2018

(51) Int. Cl.
*H04W 12/04* (2009.01)
*H04W 12/06* (2009.01)
(Continued)

(52) U.S. Cl.
CPC .......... *H04W 12/04* (2013.01); *H04L 9/0643* (2013.01); *H04L 9/088* (2013.01); *H04L 9/0891* (2013.01);
(Continued)

(58) Field of Classification Search
CPC ......... H04W 12/04; H04W 4/80; H04W 4/40; H04W 76/10; H04W 12/02; H04W 12/06;
(Continued)

(56) References Cited

U.S. PATENT DOCUMENTS 6,658,328 B1  12/2003  Alrabady
7,084,734 B2   8/2006  Singh
(Continued)

FOREIGN PATENT DOCUMENTS

CN    105083218 A    11/2015
JP    2012117292 A1   6/2012
(Continued)

OTHER PUBLICATIONS

Search Report dated Jul. 30, 2018 for GB Patent Application No. GB 1802279.8 (5 pages).
(Continued)

*Primary Examiner* — Yonas A Bayou
(74) *Attorney, Agent, or Firm* — Frank Lollo; Neal, Gerber & Eisenberg LLP; James P. Muraff

(57) ABSTRACT

A vehicle includes: (i) a main telematics module, (ii) a connectivity module including antenna(s) and processor(s). The connectivity module is configured to: (a) authenticate a mobile device via a vehicle-access-key (VAK); (b), if (a), issue an ephemeral-session-key (DSK) to the mobile device; (c), if (b), establish an active session with the mobile device; (d) encrypt all messages to the mobile device with the VAK during (a) and with the DSK during (c). The connectivity module is configured to automatically revoke the DSK upon expiration of a predetermined time interval.

20 Claims, 7 Drawing Sheets

(51) Int. Cl.
| | |
|---|---|
| *H04L 29/06* | (2006.01) |
| *H04L 9/32* | (2006.01) |
| *H04W 76/10* | (2018.01) |
| *H04L 9/06* | (2006.01) |
| *H04L 9/08* | (2006.01) |
| *H04W 12/02* | (2009.01) |
| *H04W 4/80* | (2018.01) |
| *H04W 4/40* | (2018.01) |
| *H04L 29/08* | (2006.01) |

(52) U.S. Cl.
CPC .......... *H04L 9/3242* (2013.01); *H04L 9/3268* (2013.01); *H04L 9/3271* (2013.01); *H04L 63/061* (2013.01); *H04L 63/068* (2013.01); *H04L 63/123* (2013.01); *H04L 67/141* (2013.01); *H04W 4/40* (2018.02); *H04W 4/80* (2018.02); *H04W 12/02* (2013.01); *H04W 12/06* (2013.01); *H04W 76/10* (2018.02); H04L 2209/80 (2013.01)

(58) Field of Classification Search
CPC ..... H04L 9/0643; H04L 9/088; H04L 9/0891; H04L 9/3242; H04L 9/3268; H04L 9/3271; H04L 63/061; H04L 63/068; H04L 63/123; H04L 2209/80
See application file for complete search history.

(56) References Cited

U.S. PATENT DOCUMENTS

| | | | |
|---|---|---|---|
| 7,446,644 B2 | 11/2008 | Schaffzin | |
| 8,045,961 B2 | 10/2011 | Ayed | |
| 8,053,922 B2 | 11/2011 | Muller | |
| 8,284,020 B2 | 10/2012 | Ghabra | |
| 8,792,826 B2 | 7/2014 | Willis | |
| 8,811,900 B2 | 8/2014 | Kirsch | |
| 9,008,917 B2 | 4/2015 | Gautama | |
| 9,082,295 B1 | 7/2015 | Harris | |
| 9,168,927 B2 | 10/2015 | Louboutin | |
| 9,218,700 B2 | 12/2015 | Gautama et al. | |
| 9,241,235 B2 | 1/2016 | Santavicca | |
| 9,358,940 B2 | 6/2016 | Cooper | |
| 9,667,608 B2* | 5/2017 | Witherspoon | H04W 12/04 |
| 9,883,388 B2* | 1/2018 | Kim | H04W 12/06 |
| 9,912,647 B2* | 3/2018 | Reece | H04L 63/062 |
| 2003/0193388 A1 | 10/2003 | Ghabra | |
| 2005/0221868 A1 | 10/2005 | Childress | |
| 2007/0052520 A1 | 3/2007 | Talty | |
| 2007/0162191 A1 | 7/2007 | Matsubara | |
| 2007/0189528 A1* | 8/2007 | Ueda | H04L 9/0844 380/44 |
| 2007/0200670 A1 | 8/2007 | McBride | |
| 2008/0224895 A1 | 9/2008 | Krishna | |
| 2009/0063863 A1* | 3/2009 | Durand | H04L 9/0844 713/171 |
| 2009/0136035 A1 | 5/2009 | Lee | |
| 2009/0153294 A1 | 6/2009 | Katagiri | |
| 2009/0224879 A1 | 9/2009 | Nakazawa | |
| 2009/0307483 A1* | 12/2009 | Falk | H04L 63/0435 713/153 |
| 2010/0052931 A1 | 3/2010 | Kolpasky | |
| 2010/0304690 A1 | 12/2010 | Proefke | |
| 2011/0086668 A1* | 4/2011 | Patel | G08C 17/02 455/556.1 |
| 2011/0177790 A1 | 7/2011 | Monte | |
| 2012/0244877 A1 | 9/2012 | Margalef | |
| 2012/0271380 A1* | 10/2012 | Roberts | A61N 1/37252 607/60 |
| 2012/0328101 A1* | 12/2012 | Lakshminarayanan | H04L 63/0823 380/258 |
| 2012/0331304 A1 | 12/2012 | She | |
| 2013/0099892 A1* | 4/2013 | Tucker | G07C 9/00309 340/5.61 |
| 2014/0049361 A1 | 2/2014 | Ahearn | |
| 2014/0079217 A1* | 3/2014 | Bai | H04L 63/0869 380/270 |
| 2014/0240091 A1 | 8/2014 | Talty | |
| 2014/0253288 A1 | 9/2014 | O'Brien | |
| 2014/0255036 A1 | 9/2014 | Jovicic | |
| 2014/0274013 A1 | 9/2014 | Santavicca | |
| 2014/0274223 A1 | 9/2014 | Kleve | |
| 2014/0277837 A1 | 9/2014 | Hatton | |
| 2014/0292481 A1 | 10/2014 | Dumas et al. | |
| 2015/0026648 A1 | 1/2015 | Wu | |
| 2015/0028995 A1 | 1/2015 | Gautama | |
| 2015/0048927 A1 | 2/2015 | Simmons | |
| 2015/0116079 A1 | 4/2015 | Mishra et al. | |
| 2015/0149042 A1 | 5/2015 | Cooper | |
| 2015/0161834 A1 | 6/2015 | Spahl | |
| 2015/0192423 A1 | 7/2015 | Van Wiemeersch | |
| 2015/0235486 A1 | 8/2015 | Ellis | |
| 2015/0258962 A1 | 9/2015 | Khanu | |
| 2015/0291126 A1 | 10/2015 | Nicholls | |
| 2015/0341766 A1 | 11/2015 | Nelson | |
| 2015/0362997 A1 | 12/2015 | Hatton | |
| 2016/0042644 A1 | 2/2016 | Velusamy | |
| 2016/0063786 A1 | 3/2016 | Lewis | |
| 2016/0140788 A1 | 5/2016 | Delevoye | |
| 2016/0144826 A1 | 5/2016 | Nelson | |
| 2016/0197398 A1 | 7/2016 | Scheim | |
| 2016/0217676 A1 | 7/2016 | Kurtovic | |
| 2016/0277911 A1 | 9/2016 | Kang | |
| 2016/0358396 A1 | 12/2016 | Spiess | |
| 2016/0358397 A1 | 12/2016 | Kristensen | |
| 2016/0366102 A1* | 12/2016 | Smith | H04L 63/045 |
| 2017/0113652 A1 | 4/2017 | Tokudome | |
| 2017/0120868 A1 | 5/2017 | Watanabe | |
| 2017/0134351 A1 | 5/2017 | Fujiwara et al. | |
| 2017/0142104 A1 | 5/2017 | Masuda et al. | |
| 2017/0346878 A1 | 11/2017 | Baker | |
| 2017/0359717 A1* | 12/2017 | Adler | H04W 12/04 |
| 2018/0029560 A1 | 2/2018 | Mohaupt | |
| 2018/0088577 A1 | 3/2018 | Kim | |

FOREIGN PATENT DOCUMENTS

| | | |
|---|---|---|
| KR | 101565848 B1 | 11/2015 |
| WO | WO 2016002129 A1 | 1/1916 |
| WO | WO 2015135337 A1 | 9/2015 |
| WO | WO 2017/181035 A1 | 10/2017 |

OTHER PUBLICATIONS

Menezes AJ et al., Handbook of Applied Cryptography, published 1997, CRC Press LLC, pp. 401 and 497, (2 pages).
Search Report dated Feb. 21, 2018 for GB Patent Application No. 1715060.8 (7 pages).
Search Report dated May 24, 2018 for GB Patent Application No. 1719926.6 (4 pages).

* cited by examiner

SECURE SESSION COMMUNICATION BETWEEN A MOBILE DEVICE AND A BASE STATION

TECHNICAL FIELD

This application relates to secure communication between a mobile device, such as a smartphone, and a base station, such as a vehicle, a server, or a second mobile device.

BACKGROUND

Mobile devices (e.g., smartphones) have become pervasive and are used for more than voice conversation and text messaging. The increasing availability of high-speed Internet, coupled with new technologies such as Bluetooth and NFC have enabled new uses such as mobile payments, health monitoring and more. These technologies however are not perfectly secure, and on their own cannot be trusted to communicate sensitive or potentially safety-critical information between two devices.

Additional use cases for a mobile device include interacting with a vehicle (or other base station such as a house, a server, a second mobile device, etc) to cause the vehicle (or other base station) to perform entry, start, lock/unlock, and other functions. Some prior art references disclose these use-cases. These references, however, fail to provide efficient and effective security for communication between the mobile device and the vehicle. Standardized communication technologies such as Bluetooth and WiFi fail to sufficiently secure communication.

New and improved techniques for secure communication between a mobile device and a vehicle (or other base station) are therefore needed.

SUMMARY

Disclosed is an efficient method to secure command and control communications between the mobile device and vehicle without relying on any security offered by the wireless delivery mechanism (e.g., Bluetooth or WiFi).

The method may rely on knowledge of a pre-shared cryptographic key called the VAK. This key is shared to both the mobile device and the vehicle in an out-of-band, secure manner from a backend system. The key is unique per mobile device and/or user of the mobile device (e.g., user A of the mobile device is associated with a first VAK and user B of the mobile device is associated with a second VAK). Furthermore, each user of the mobile device may be associated a different VAK for each of a plurality of vehicles. The users may log in to the mobile device (e.g., an app on the mobile device). The mobile device may recognize which VAKs are associated with a user based on the log-in information. The mobile device may prevent the user from applying VAKs associated with other users. Thus, the VAK can be used to confirm a device's identity. The vehicle can store multiple keys representing multiple different mobile devices and/or users.

The solution also implements an ephemeral session key called the DSK, which is used for protecting messages following authentication of the mobile device. A temporal and ephemeral key both prevents replay of entire sessions and ensures secrecy of messages across sessions—knowledge of one session key does not allow one to decrypt messages from any other session.

An optional counter is also provided. The counter is useful to prevent message replay attacks. The counter may optionally be used as a nonce during authentication.

A vehicle consistent with the present disclosure thus includes: (i) a main telematics module, (ii) a connectivity module including antenna(s) and processor(s). The connectivity module is configured to: (a) authenticate a mobile device via a vehicle-access-key (VAK); (b), if (a), issue an ephemeral-session-key (DSK) to the mobile device; (c), if (b), establish an active session with the mobile device; (d) encrypt some or all messages to the mobile device with the VAK during (a) and with the DSK during (c). The connectivity module is configured to automatically revoke the DSK upon expiration of a predetermined time interval.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
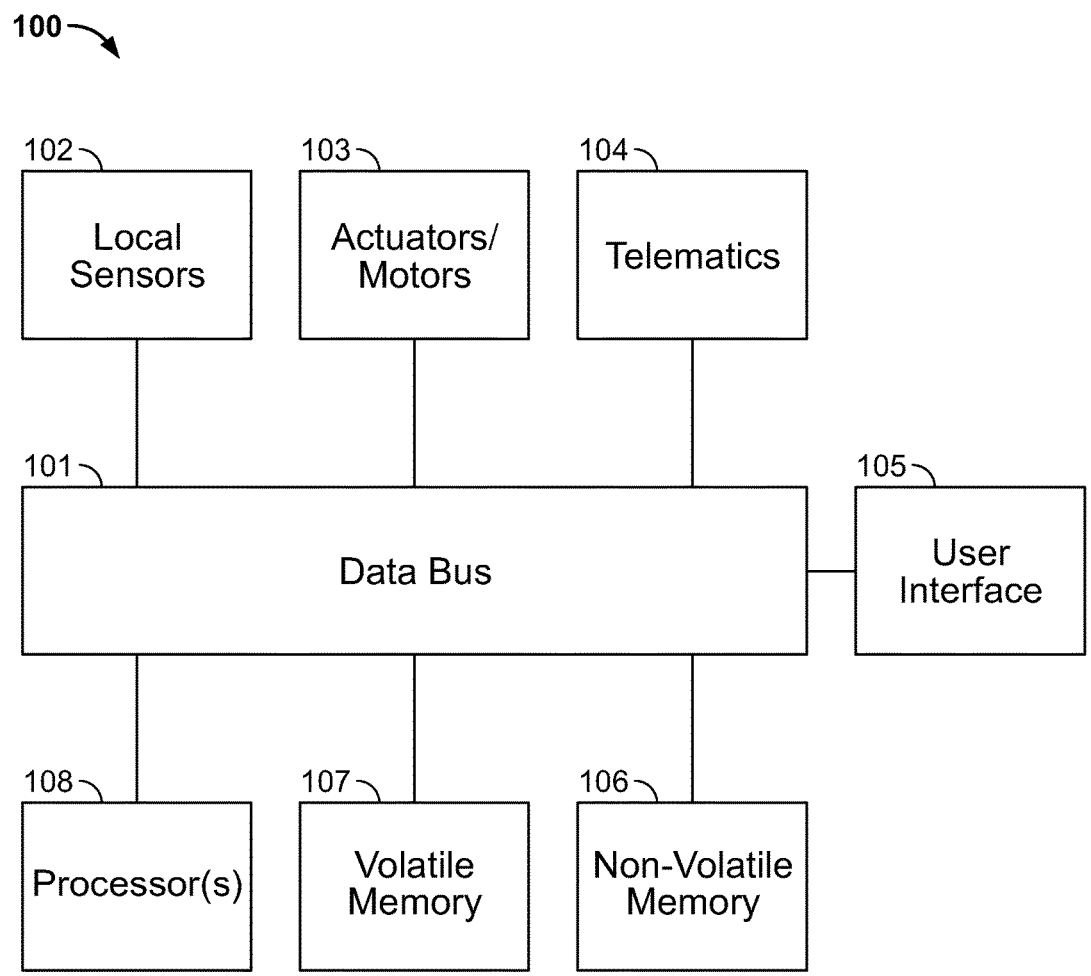
FIG. 1 is a block diagram of a vehicle computing system.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present, as one option, and mutually exclusive alternatives as another option. In other words, the conjunction "or" should be understood to include "and/or" as one option and "either/or" as another option.

FIG. 1 shows a computing system 100 of a base station, such as a host vehicle 200. Although the base station is discussed as being host vehicle 200, the base station may be any suitable equipped device such as a mobile phone, a tablet, a server, etc. Host vehicle 200 is connected, meaning that host vehicle 200 is configured to (a) receive wireless data from external entities (e.g., infrastructure, servers, other connected vehicles) and (b) transmit wireless data to external entities. Host vehicle 200 may be autonomous, semi-autonomous, or manual. Host vehicle 200 includes a motor, a battery, at least one wheel driven by the motor, and a steering system configured to turn the at least one wheel about an axis. Host vehicle 200 may be fossil fuel powered (e.g., diesel, gasoline, natural gas), hybrid-electric, fully electric, fuel cell powered, etc.

Vehicles are described, for example, in U.S. patent application Ser. No. 15/076,210 to Miller, U.S. Pat. No. 8,180,547 to Prasad, U.S. patent application Ser. No. 15/186,850 to Lavoie, U.S. Patent Publication No. 2016/0117921 to D'Amato, and U.S. patent application Ser. No. 14/972,761 to Hu, all of which are hereby incorporated by reference in their entireties. Host vehicle 200 may include any of the features described in Miller, Prasad, Lavoie, D'Amato, and Hu.

Computing system 100 resides in host vehicle 200. Computing system 100, among other things, enables automatic control of mechanical systems within host vehicle 200 and facilitates communication between host vehicle 200 and external entities (e.g., connected infrastructure, the Internet, other connected vehicles). Computing system 100 includes a data bus 101, one or more processors 108, volatile memory 107, non-volatile memory 106, user interfaces 105, a telematics unit 104, actuators and motors 103, and local sensors 102.

Data bus 101 traffics electronic signals or data between the electronic components. Processor 108 performs operations on electronic signals or data to produce modified electronic signals or data. Volatile memory 107 stores data for near-immediate recall by processor 108. Non-volatile memory 106 stores data for recall to the volatile memory 107 and/or the processor 108. Non-volatile memory 106 includes a range of non-volatile memories including hard drives, SSDs, DVDs, Blu-Rays, etc. User interface 105 includes displays, touch-screen displays, keyboards, buttons, and other devices that enable user interaction with the computing system. Telematics unit 104 enables both wired and wireless communication with external entities via Bluetooth, cellular data (e.g., 3G, LTE), USB, etc.

Actuators/motors 103 produce tangible results. Examples of actuators/motors 103 include fuel injectors, windshield wipers, brake light circuits, transmissions, airbags, motors mounted to sensors (e.g., a motor configured to swivel a local sensor 102), engines, power train motors, steering, blind spot warning lights, etc.

Local sensors 102 transmit digital readings or measurements to processors 108. Examples of local sensors 102 include temperature sensors, rotation sensors, seatbelt sensors, speed sensors, cameras, lidar sensors, radar sensors, infrared sensors, ultrasonic sensors, clocks, moisture sensors, rain sensors, light sensors, etc. It should be appreciated that any of the various electronic components of FIG. 1 may include separate or dedicated processors and memory. Further detail of the structure and operations of computing system 100 is described, for example, in Miller, Prasad, Lavoie, and Hu.

Figure 2:
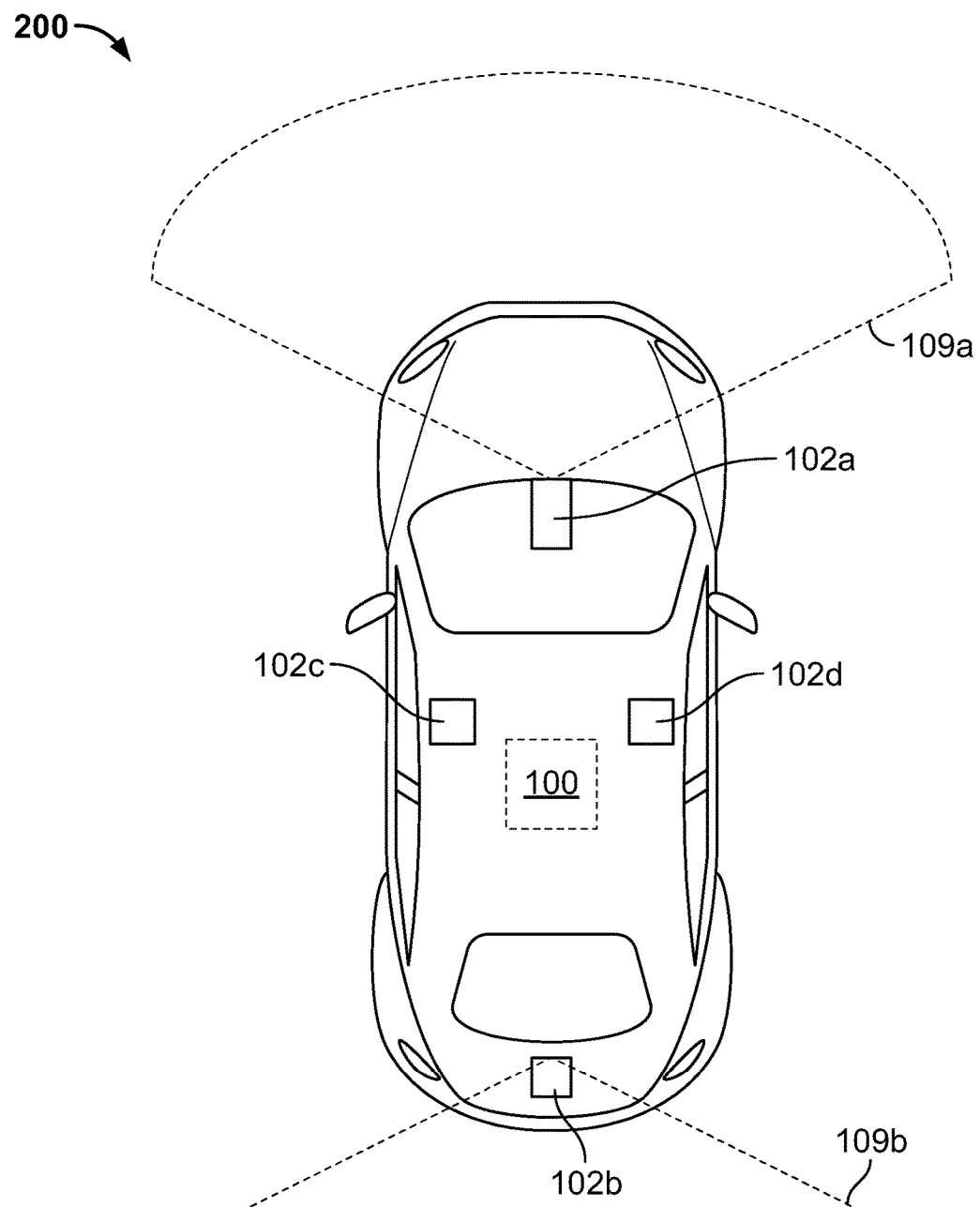
FIG. 2 is a top plan view of a host vehicle including the vehicle computing system.

FIG. 2 generally shows and illustrates host vehicle 200, which includes computing system 100. Some of the local sensors 102 are mounted on an exterior of host vehicle 200 (others are located inside the vehicle 200). Local sensor 102a is configured to detect objects leading the vehicle 200. Local sensor 102b is configured to detect objects trailing the vehicle 200 as indicated by trailing sensing range 109b. Left sensor 102c and right sensor 102d are configured to perform similar functions for the left and right sides of the vehicle 200.

As previously discussed, local sensors 102a to 102d may be ultrasonic sensors, lidar sensors, radar sensors, infrared sensors, cameras, microphones, and any combination thereof, etc. Host vehicle 200 includes a plurality of other local sensors 102 located in the vehicle interior or on the vehicle exterior. Local sensors 102 may include any or all of the sensors disclosed in Miller, Prasad, Lavoie, D'Amato, and Hu. The general arrangement of components shown in FIGS. 1 and 2 is prior art.

It should be appreciated that host vehicle 200, and more specifically, processors 108 of host vehicle 200, is/are configured to perform the methods and operations described herein. In some cases, host vehicle 200 is configured to perform these functions via computer programs stored on volatile 107 and/or non-volatile 106 memories of computing system 100.

One or more processors are "configured to" perform a disclosed method step, block, or operation, at least when at least one of the one or more processors is in communication with memory storing a software program with code or instructions embodying the disclosed method step or block. Further description of how processors, memory, and software cooperate appears in Prasad. According to some embodiments, a mobile phone or external server(s) in communication with host vehicle 200 perform some or all of the methods and operations discussed below.

Host vehicle 200 may include some or all of the features of vehicle of Prasad. Computing system 100 may include some or all of the features of the VCCS of Prasad. Host vehicle 200 may be in communication with some or all of the devices shown in FIG. 1 of Prasad, including the nomadic or mobile device, the communication tower, the telecom network, the Internet, and the data processing center (i.e., one or more servers). Each of the entities described in this application may share any or all of the features described with reference to FIG. 1 and FIG. 3.

The term "loaded vehicle," when used in the claims, is hereby defined to mean: "a vehicle including: a motor, a plurality of wheels, a power source, and a steering system; wherein the motor transmits torque to at least one of the plurality of wheels, thereby driving the at least one of the plurality of wheels; wherein the power source supplies energy to the motor; and wherein the steering system is configured to steer at least one of the plurality of wheels." Host vehicle 200 may be a loaded vehicle.

Figure 3:
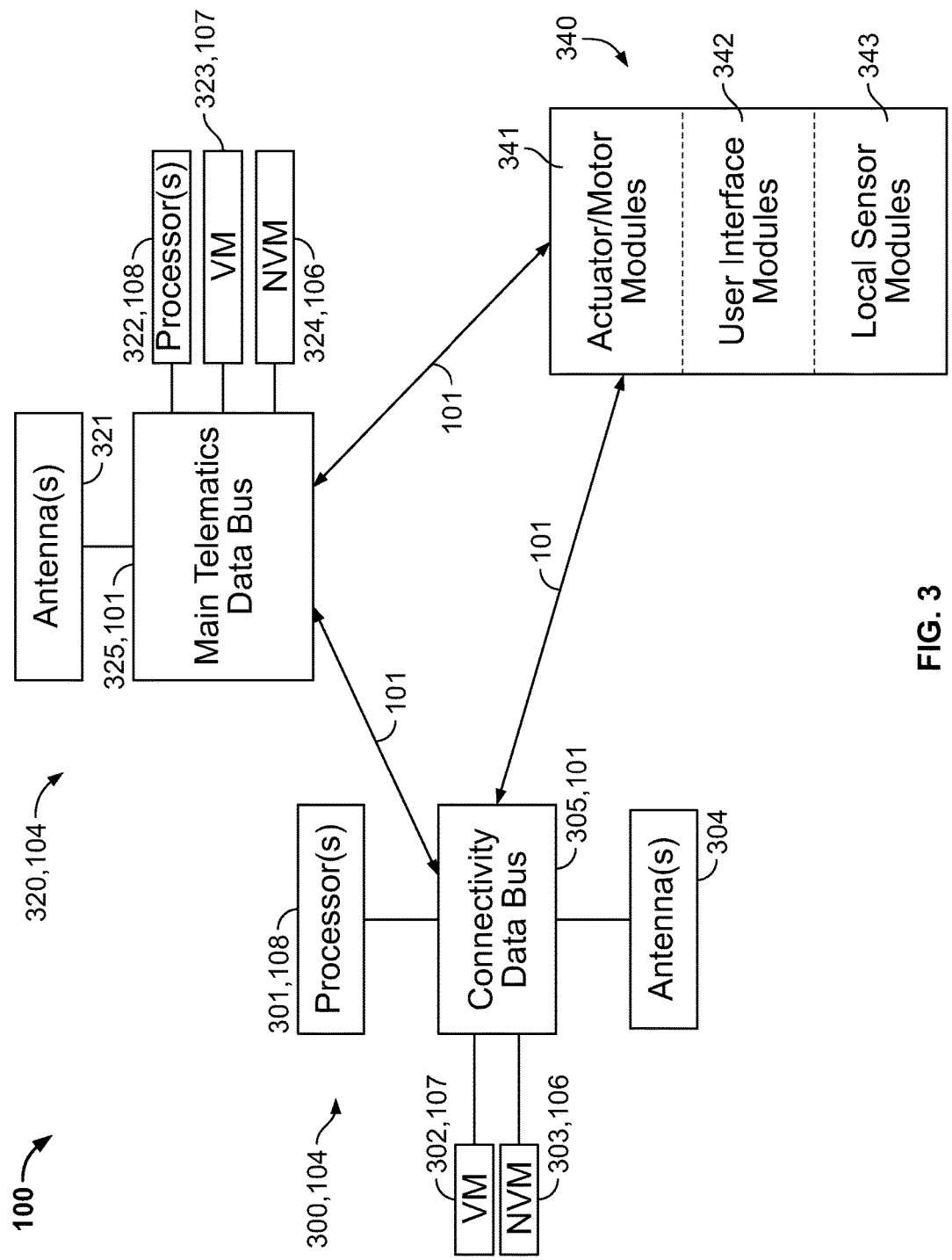
FIG. 3 is a block diagram of the vehicle computing system

The term "equipped electric vehicle," when used in the claims, is hereby defined to mean "a vehicle including: a battery, a plurality of wheels, a motor, a steering system; wherein the motor transmits torque to at least one of the plurality of wheels, thereby driving the at least one of the plurality of wheels; wherein the battery is rechargeable and is configured to supply electric energy to the motor, thereby driving the motor; and wherein the steering system is configured to steer at least one of the plurality of wheels." Host vehicle 200 may be an equipped electric vehicle FIG. 3 shows a more specific implementation of computing system 100. As illustrated, computing system 100 includes a connectivity module 300, a main telematics module 320, and a plurality of other modules 340.

Connectivity module 300 includes one or more processors 301, volatile memory 302, non volatile memory 303, one or more antennas 304, and a data bus 305. Main telematics module 320 includes one or more processors 322, volatile memory 323, non volatile memory 324, one or more antennas 321, and a data bus 325.

The other modules 340 include a plurality of modules, such as actuator/motor modules 341, user interface modules 342, and local sensor modules 343. Each of the other modules 340 includes one or more processors, volatile memory, and non volatile memory. At least some of the actuator/motor modules are connected to motors/actuators 103 such as motors, engines, etc.

The other modules 340 control the substantive driving and safety functions of host vehicle 200, such as providing power to the wheels, performing safety functions (e.g., deploying airbags), controlling the radio, mapping the vehicle's route, etc.

Main telematics module 320 is the primary communication bridge between host vehicle 200 and external entities (e.g., servers, other vehicles, the Internet, mobile devices, etc.). Connectivity module 300 is (a) the primary communication bridge between host vehicle 200 and specific mobile devices and (b) an authenticator of at least some external entities in communication with host vehicle 200. As described below, connectivity module 300 directly communicates, via antennas 304, with specific mobile devices and authorizes the specific mobile devices to control main telematics module 320 and/or some or all of the other modules 340. Thus, antennas 321 of main telematics module 320 may be equipped for long-range communication over the Internet (e.g., cellular communication) while antennas 304 of connectivity module 300 may be only equipped for short-range communication (e.g., Bluetooth low energy communication). Connectivity module 300 may be configured to only accept and broadcast messages prepared at connectivity module processors 301, while main telematics module 320 may be configured to accept and broadcast messages prepared at any module.

Figure 4:
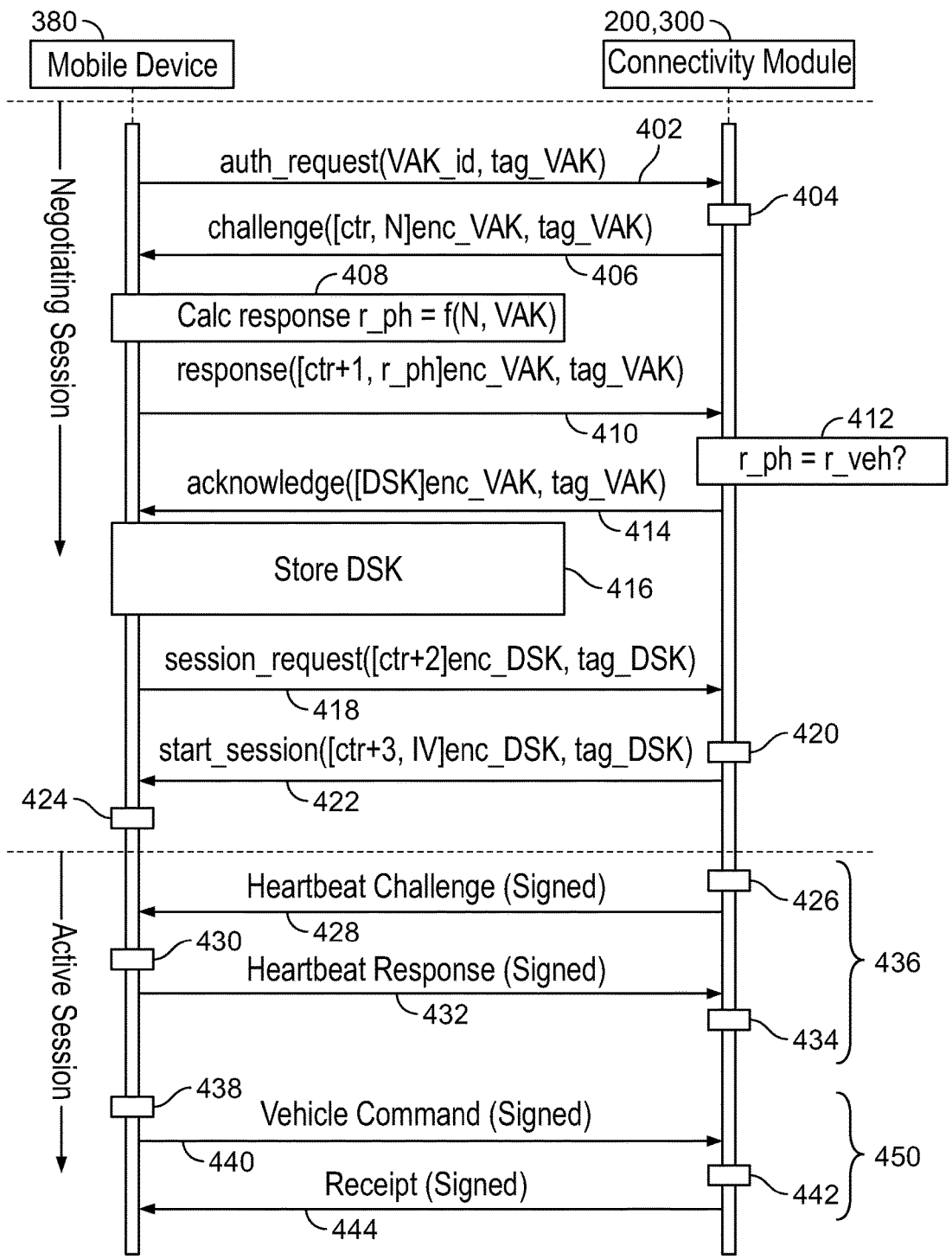
FIG. 4 is a flow chart of establishing an active session between the host vehicle and a mobile device. Time advances downward.

FIG. 4 shows operations associated with negotiating a session between mobile device 380 and host vehicle 200. Upon negotiating the session, an active session occurs on both mobile device 380 and host vehicle 200. During the active session, connectivity module 300 forwards commands issued by mobile device 380 to the other modules 340. For example, upon pairing, host vehicle 200 may enable mobile device 380 to issue: an unlock command causing host vehicle 200 to unlock its doors, a lock command causing host vehicle 200 to lock its doors, a motor start command, an engine start command, a window adjust command, a panic command, etc. Before connectivity module 300 begins the active session, connectivity module 300 may reject any messages including commands for the other modules 340.

Communications in FIG. 4 may be exclusively conducted between mobile device 380 and connectivity module 300, except for authentication request 402, which may be sent from mobile device 380 to main telematics module 320 and then forwarded by main telematics module 320 to connectivity module 300. Alternatively, as disclosed below, all communications may routed through main telematics module 320.

Authentication request 402 is a request for connectivity module 300 to authenticate mobile device 380. Authentication request 402 includes (a) a vehicle access key (VAK) ID ("VAK_id") and (b) a tag of the VAK ID ("tag_VAK").

Although not shown, one, more, or all of the messages originated at mobile device 380 and one, more, or all of the messages originated at connectivity module 300 of host vehicle 200 may include unencrypted routing metadata. The routing metadata may (i) instruct the receiving entity (mobile device 380 or host vehicle 200) to route the message to a specific location within the receiving entity (e.g., a specific program or a specific piece of hardware). The routing metadata may (ii) instruct the transmitting entity to route the message to a specific receiving entity.

For example, and with reference to FIG. 3, connectivity module 300 may lack antennas. As such, when transmitting messages, connectivity module may include first routing metadata in the messages instructing main telematics 320 to route the message to a specific mobile device. Connectivity module may include second routing metadata in the messages instructing telematics of the mobile device to route the message to specific hardware or software within the mobile device 380. As such, connectivity module 300 may lack antennas 304 and communicate with mobile device 380 via main telematics 320.

The vehicle access key is a cryptographic key used to facilitate the negotiating session of FIG. 4. For the purposes of FIG. 4, both mobile device 380 and connectivity module 300 already store (i.e., know) the VAK. The VAK ID is a unique identifier (i.e., name) of the specific VAK stored in mobile device 380 and connectivity module 300. Generation and distribution of the VAK and VAK ID to the mobile device 380 and host vehicle 200 is discussed below with reference to FIG. 7.

The tag of the VAK ID is a hash of the VAK ID performed with a hashing function prestored on the mobile device 380. When the present application states that a hash on something has been performed (e.g., the hash on the VAK ID has been performed), at least two things may be possible: first, the listed inputs are the only inputs to the hashing function; second, the hashing function uses the listed inputs, and possibly other inputs, when generating the hash.

It should be appreciated that for the hashing to be effective, the hashing function and inputs thereto on the mobile phone must be equivalent to the hashing function and the inputs thereto on the host vehicle. Thus, to the extent that the mobile device includes other inputs in the hash (e.g., the date), the host vehicle must include the same inputs when calculating the reciprocal hash (discussed below).

In general, hashing functions apply arbitrary mathematical operations to inputs. For example, one hashing function may generate an output by multiplying every input together and then subtracting seven from the multiplication result. Thus, if the inputs to the hashing function are 127, 434, and 22 the output of the hashing function would be (127*434*22−7)=1212589. As another example, one hashing function may sum the first value of every input. Thus, if the inputs to the hashing function are 127, 434, and 22 the output of the hashing function would be (1+4+2)=7. Many other possibilities exist.

The point of hashing functions is to confirm that inputs to one operation (e.g., an operation performed on mobile device 380) are equal to the inputs on another operation (e.g., an operation performed on host vehicle 200), without ever disclosing the exact values of the inputs. Thus, if host vehicle 200 receives a hash of 1212589 from mobile device 380, performs a reciprocal hash on values stored on host vehicle 200, and outputs a reciprocal hash of 1212589, host vehicle 200 knows that the inputs on the mobile device 380 (here, 127, 434, and 22) are the same as the inputs on host vehicle 200 (again 127, 434, and 22). Someone who intercepts the hash of 1212589 (e.g., a hacker), would not be able to reverse engineer the inputs of 127, 434, and 22 because the hash of 1212589 could be the result of any series of inputs (e.g., 4, 7, 43307; or 2, 14, 44307; etc) or could be the result of any hashing function.

At block 404, host vehicle 200 performs the reciprocal hash (i.e., applies the same hash function) on the VAK ID and compares the hash received at 402 with the reciprocal hash generated at 404. If the hashes match, then host vehicle 200 responds with a challenge 406. The challenge 406 includes (a) a counter (which is similar to a rolling code) ("ctr") and a randomly generated nonce ("N"), which are individually encrypted according to the VAK ("enc_VAK") and (b) a hash of the VAK ("tag_VAK"). The counter may be used as the nonce. The counter may be randomly generated at block 404.

At block 408, mobile device 380 decrypts the counter and the nonce, performs a reciprocal hash on the decrypted counter and nonce, and compares the reciprocal hash to the hash included in challenge 406. If the hashes match, then mobile device 380 calculates a mobile response ("r_ph"), which is a function of the nonce and the VAK and sends a challenge response 410. The challenge response 410 includes (a) the incremented counter ("ctr+1") and the calculated mobile response ("r_ph"), which are individually encrypted according the VAK ("enc_VAK") and (b) a hash of the VAK ("tag_VAK").

According to preferred embodiments, the hash (i.e., "tag_" of encryption keys) may be replaced with a message authentication code (MAC). This optionally applies to every use of the term "hash" or "tag_" in the application.

The MAC may include some or all of the following: (1) An unencrypted ID of the encryption key. As discussed elsewhere, each encryption key (e.g., the VAK and DSK) may be paired with a unique ID when generated. (2) An unencrypted first hash of all data in the message that was encrypted according to the encryption key. The first hash may further include the unencrypted ID. (3) A second unencrypted hash of the unencrypted encryption key. (4) A third unencrypted hash with (2) and (3) as inputs to the hash function. According to an especially preferred embodiment, the MAC only includes (1), (2), and (4), but not (3). When the present application discusses reciprocal hashes, such reciprocal hashes apply to the MAC. Put differently, upon receiving a message with a MAC, the mobile device 300 or host vehicle 200 may perform the following reciprocal hashing steps: (a) ensuring the unencrypted ID is correct, (b) based on the ID, ensuring that (3), the second unencrypted hash of the unencrypted encryption key is correct, (c) decrypting the message if (a) and (b) are confirmed, and (d) confirming that (4), the third unencrypted hash is correct after (c).

At block 412, host vehicle 200 decrypts the incremented counter and the calculated response, performs or references a reciprocal hash of the VAK, and compares the reciprocal hash of the VAK to the hash of the VAK in challenge response 410. If the hashes match and the incremented counter exceeds the original counter sent via challenge 406, then host vehicle 200 calculates a vehicle response ("r_veh"), which is a function of the nonce and the VAK.

The function applied to calculate the vehicle response, r_veh, is the same as the function applied to calculate the mobile device response, r_ph. Host vehicle 200 compares the vehicle response, r_veh, with the mobile device response r_ph. If the responses match, then host vehicle 200 generates a random, ephemeral session key ("DSK"). The session key has a limited lifetime to limit exposure in the event a hacker computes the DSK. Put differently, host vehicle 200 will only recognize the DSK and thus only recognize messages encrypted according to the DSK for a predetermined amount of time (e.g., 6 hours).

After generating the DSK, host vehicle 200 transmits an acknowledgement 414. The acknowledgement 414 includes the DSK encrypted according to the VAK ("enc_VAK") and a hash of the VAK ("tag_VAK"). At block 416, mobile device 380 confirms that the hash of the VAK is valid (as described above, by comparing the hash of the VAK in the acknowledgement 414 with a reciprocal hash performed by mobile device 380). If the hash is valid, mobile device 380 decrypts the DSK with the VAK, stores the DSK, and transmits a session request 418.

The session request 418 includes the twice incremented counter ("ctr+2"), encrypted according to the DSK and a hash of the DSK. At block 420, host vehicle 200 confirms that the hash of the DSK is valid by generating a reciprocal hash with the DSK, and confirms that the twice incremented counter exceeds the once incremented counter ("ctr+1"). If so, host vehicle 200 recognizes that the session has started and host vehicle 200 transmits a start session message 422.

The start session message 422 includes (a) a thrice incremented counter ("ctr+3"), an initialization vector ("IV"), which are individually encrypted according to the DSK and (b) a hash of the DSK. At block 424, the mobile device 380 decrypts the initialization vector and the thrice incremented counter. The mobile device 380 confirms that the hash of the DSK is valid and the thrice incremented counter exceeds the twice incremented counter. If so, then mobile device 380 recognizes that the session has started.

Figure 5:
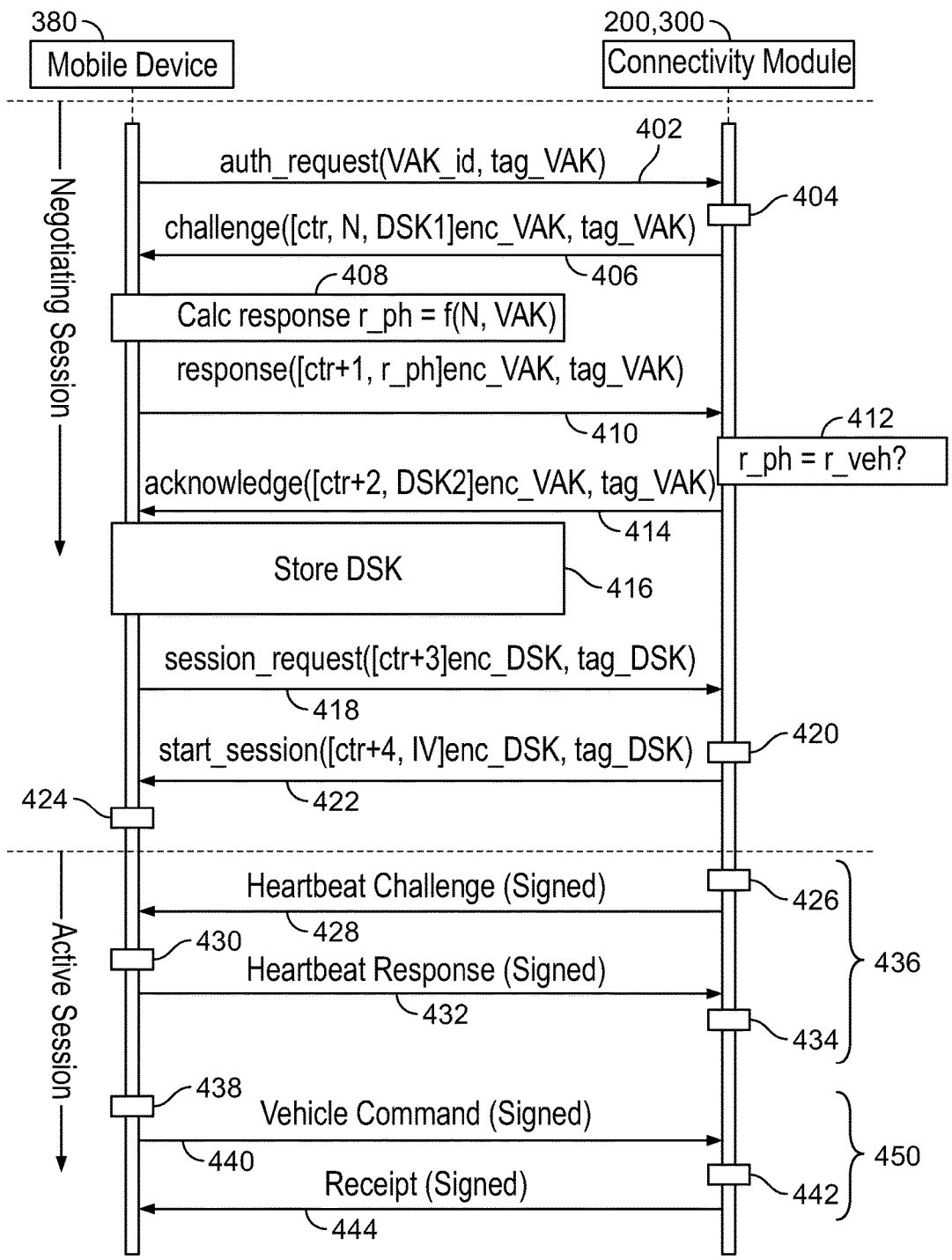
FIG. 5 is a flow chart of establishing an active session between the host vehicle and a mobile device. Time advances downward.

It should be appreciated that in addition to the above encryption techniques, each message may include encrypted substantive data (discussed below) stating the purpose of the message. Alternatively, each message may not include any substantive data and each receiving entity may recognize the message's purpose by virtue of its order in the negotiating process. To enhance this effect, and as shown in FIGS. 4 and 5, no two messages are identical. Thus, the purpose of a message can be identified by the message's structure.

Various signed messages (such as heartbeat challenges, heartbeat responds, vehicle commands, and receipts) are transmitted during the active session. A signed message may include (a) substantive data, which encrypted according to the DSK, and (b) a hash of the DSK (which may be replaced with the previously discussed authentication code). Alternatively or in addition, the signed message may include: (a) a hash of the initialization vector, (b) the substantive data first encrypted with one of the DSK and the initialization vector and then re-encrypted with the other of the DSK and the initialization vector, and (c) the re-incremented counter encrypted according to any of the above techniques (e.g., DSK alone, DSK then IV, or IV then DSK).

In response to receiving a signed message, the receiving entity (mobile device 380 or host vehicle 200) (a) verifies the signed message (by validating any hashes with reciprocal hashes and confirming that the re-incremented counter exceeds the last counter known to the mobile device 380) and (b) performs some substantive function (e.g., control a motor, unlock a door, start a motor, roll down a window, prepare and issue a message) according to the substantive data.

As shown in FIG. 4, heartbeat events 436 occur during the active session. Heartbeat events 436 enable host vehicle 200 and mobile device 380 to confirm that the wireless connection between the two is still present. At block 426, host vehicle 200 determines that a heartbeat condition has occurred. A heartbeat condition may be set to occur at a predetermined time. The count of the time is reset to zero when any signed message is received from mobile device 380 (e.g., according to the above example of sixty seconds, if a new heartbeat condition was set to occur in 30 seconds, but connectivity module 300 received a signed heartbeat response or a signed vehicle command, then the counter may be reset to zero such that the new heartbeat condition occurs in 60 seconds).

Connectivity module 300 counts a heartbeat timeout, which exceeds the time associated with the heartbeat condition (e.g., the heartbeat timeout may occur after three minutes while the heartbeat condition may occur after one minute). The heartbeat timeout resets to zero every time a signed message is received from mobile device 380.

Connectivity module 300 may transmit heartbeat challenges 428 once a heartbeat condition has occurred, but before a heartbeat timeout has occurred at a high frequency. For instance, according to the above example, connectivity module 300 waits sixty seconds after the last signed message to issue a first heartbeat challenge 428. After sixty seconds, however, connectivity module 300 may issue heartbeat challenges 428 frequently (e.g., once per five seconds) until the heartbeat timeout occurs. As discussed below, once a heartbeat time occurs, connectivity module 300 returns to standby 602 and revokes the DSK.

Host vehicle 200 transmits a signed heartbeat challenge 428 in response to block 426. At block 430, mobile device 380 validates the signed heartbeat challenge 428 and issues a signed heartbeat response 432. At block 434, host vehicle 200 validates the signed heartbeat response 432. Host vehicle 200 may generate mobile devices commands (not shown) according to the heartbeat command process 436 by including different substantive data.

Vehicle controls 450 occur during the active session. Host vehicle 200 will only process vehicle controls 450 during an active session (i.e., only after block 420 has occurred). At block 438, mobile device 380 (a) generates substantive data (e.g., unlock the doors, start the engine, blink a certain light, roll down a certain window) and (b) transmits a signed vehicle command based on the substantive data. The signing process is described above. Mobile device 380 may perform block 438 in response to a user input (e.g., a tap of a virtual button).

At block 442, host vehicle 200 validates the vehicle command and performs some substantive function based on the decrypted substantive data. Host vehicle 200 may transmit a signed receipt 444. Mobile device 380 may validate the receipt and perform some substantive function (e.g., display a message) in response to the substantive data included in the receipt.

According to some embodiments, a different hash function may be applied for each communication during the negotiating session 402, 406, 410, 414, 418, and 422. Because both mobile device 380 and host vehicle 200 know the kind of communication received (authentication request vs. challenge vs. mobile response vs. acknowledgement vs. session request vs. start session command), both mobile device 380 and host vehicle 200 know which hash function to apply to generate the reciprocal hash for validating purposes.

According to some embodiments, only a single hash function is used by host vehicle 200 and mobile device 380 during the active session. Alternatively, a first hash function is used for all heartbeat challenges, a second hash function is used for all heartbeat responses, a third hash function is used for all vehicle commands, a fourth hash function is used for all receipts thereto, a fifth hash function is used for all mobile commands, and a sixth hash function is used for all receipts thereto. All hash functions used during the active session may be different than all hash functions used during the negotiating session.

FIG. 5 shows operations associated with pairing mobile device 380 host vehicle 200. FIG. 5 includes the same features as FIG. 4, except where noted otherwise in the specification or Figures. The operations of FIG. 5 assume that the DSK is too large to be transmitted in a single message and thus break the DSK into two blocks: a first block ("DSK1") and a second block ("DSK2").

Upon receiving both the first and second blocks, DSK1 and DSK2, mobile device 380 assembles the DSK. As one example, mobile device may append DSK2 after DSK1 (e.g., if DSK1 was 45 and DSK2 was 875, then the DSK would be 45875). As other examples, mobile device may multiply DSK1 by DSK2, raise DSK1 to the power of DSK2, etc.

Host vehicle 200 may be configured to implement both FIGS. 4 and 5 and choose between based on an identity of the wireless connection established between connectivity module 300 and mobile device 380 (e.g., if connectivity module 300 determines that the wireless connection is via NFC or an old Bluetooth version, then connectivity module 300 implements FIG. 4; if connectivity module 300 determines that the wireless connection is via WiFi or a later Bluetooth version, then connectivity module 300 implements FIG. 5).

At block 404 host vehicle 200 computes the DSK and then separates the DSK into two portions: DSK1 and DSK2. Challenge 406 thus includes DSK1 encrypted according to the VAK, but not DSK2. At block 408, mobile device 380 decrypts and DSK1. At block 412, host vehicle 200 includes DSK2, encrypted according to the VAK, and the twice incremented counter in acknowledgement 414. At block 416, mobile device 380 decrypts DSK2 and assembles the DSK based on DSK1 and DSK2. Due to the twice incremented counter in acknowledgement 414, the counter in session request 418 is thrice incremented and the counter in start session command 422 is quad incremented.

Although not shown, acknowledgement 414 may include, in addition to DSK2, an assembly instruction encrypted according to the VAK. The assembly instruction, when received and opened at block 416, instructs mobile device 380 how to combine DSK1 with DSK2. The processors may be configured to determine whether DSK1 or DSK2 is smaller and transmit the DSK assembly instructions with the smaller of DSK1 and DSK2.

Figure 6:
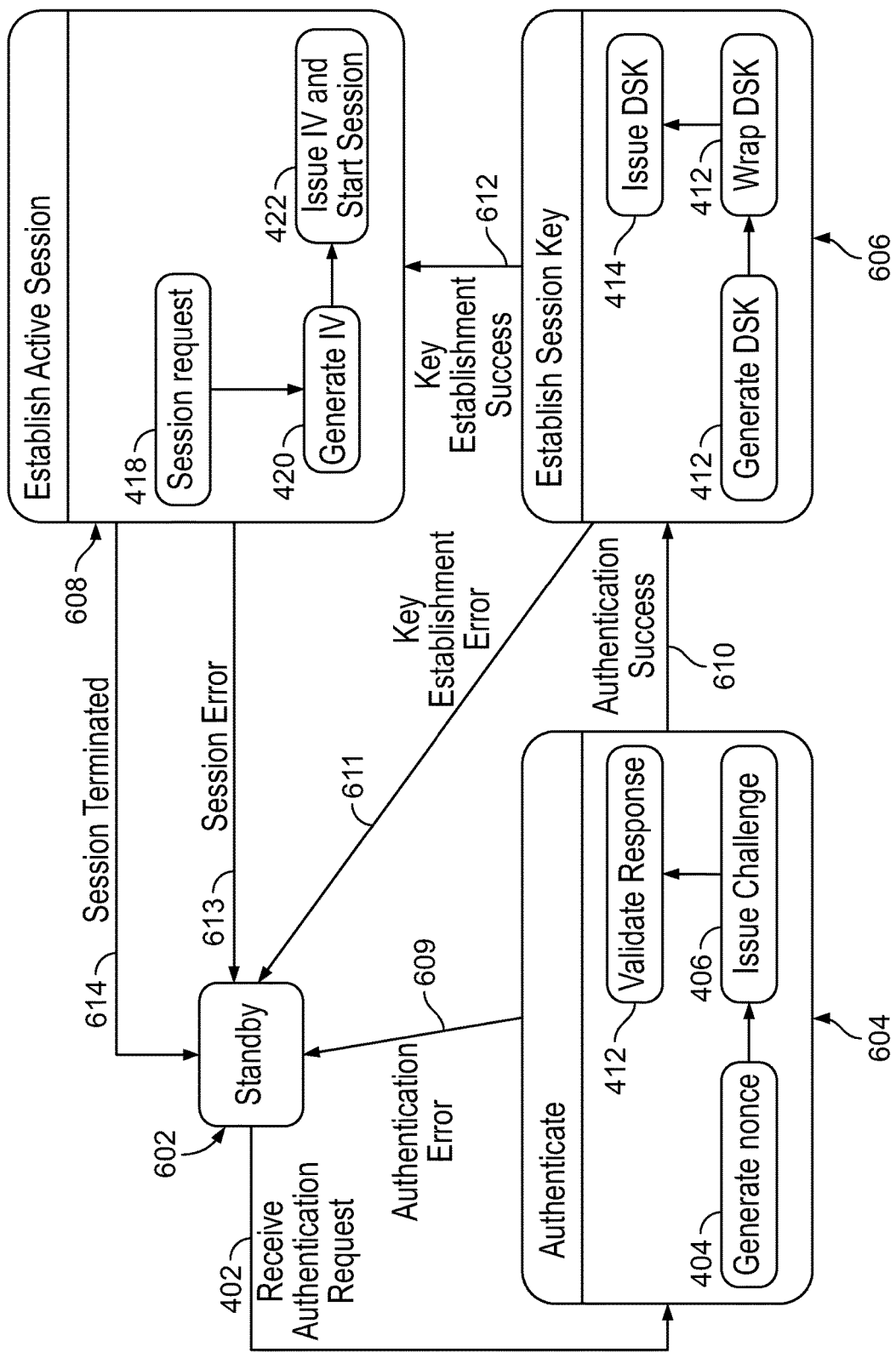
FIG. 6 is a flow chart including the operations of FIG. 4.

FIG. 6 is a flow diagram of the method of FIG. 4. At block 602, connectivity module 300 is in standby mode. Connectivity module 300 will only respond to an authentication request 402 while in standby mode (i.e., connectivity module will ignore anything other than an authentication request 402 while in standby mode 602).

Standby mode 602 is specific to a unique mobile device such that connectivity module 300 may be in standby mode with respect to mobile device A, but not in standby mode with respect to mobile device B. As later discussed, each mobile device may be associated with a unique VAK and therefore, a unique VAK ID. As such, connectivity module 300 may identify a specific mobile device via the VAK ID issued by the specific mobile device at authentication request 402. Whenever connectivity module 300 returns to standby mode 602, any active DSK is revoked, meaning that host vehicle 200 will not verify messages encrypted and/or tagged according to the previously active DSK and a new DSK must be issued.

After receiving authentication request 402, connectivity module 300 proceeds to block 604 where mobile device 380 is authenticated. If any message received from mobile device 380 is unverified (bad hash or bad counter), then an authentication error 609 occurs and connectivity module 300 returns to standby. If a timeout occurs (i.e., no message from mobile device 380 is received within a predetermined time), then an authentication error 609 occurs. Otherwise, authentication is successful 610, and connectivity module proceeds to block 606.

If any message received from mobile device 380 is unverified (bad hash or bad counter), then a key establishment error 611 occurs and connectivity module 300 returns to standby. If a timeout occurs (i.e., no message from mobile device 380 is received within a predetermined time), then a key establishment error 611 occurs. Otherwise, key establishment is successful 612, and connectivity module proceeds to block 608 where an active session is established.

If, during the active session, (a) any signature is unverified or (b) any heartbeat timeout occurs (as previously discussed), then a session error 613 occurs and connectivity module 300 returns to standby mode 602. As stated above, the DSK is ephemeral and expires after a predetermined time (e.g., one hour) after being issued at block 412. Upon expiration, session termination 614 occurs and connectivity module 300 rejects messages with validation predicated on the DSK (e.g., being encrypted with the DSK, including tag of the DSK). Upon session termination 614, host vehicle 200 may transmit a message to mobile device 380 instructing mobile device 380 to automatically issue an authentication request 402 to generate a new DSK. The message may be encrypted according to the VAK or may be encrypted according to the old DSK.

Figure 7:
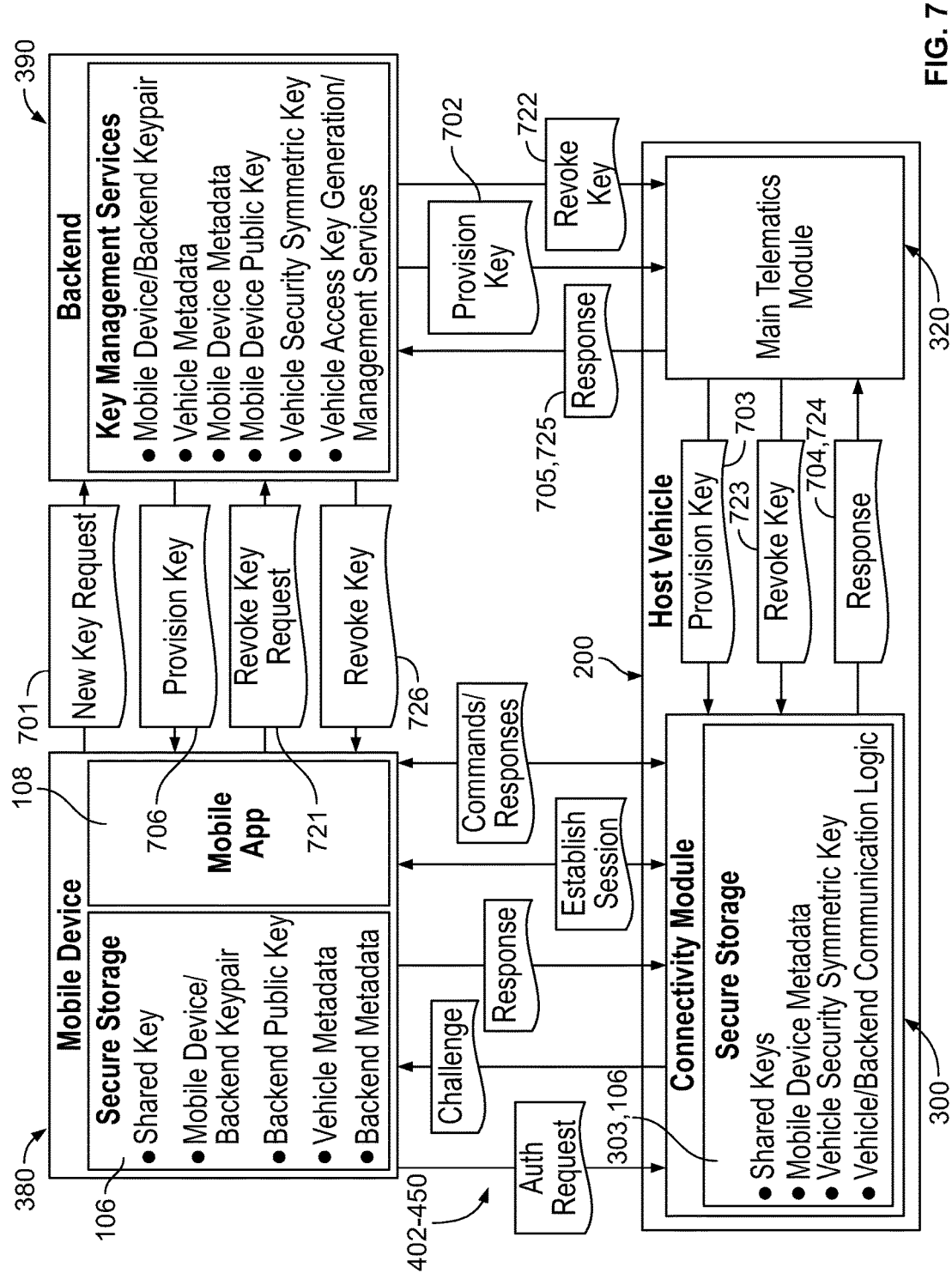
FIG. 7 is a flow chart of provisioning and revoking vehicle access keys.

FIG. 7 is a flow diagram of preloading the VAK onto mobile device 380 and host vehicle 200. Backend 390 (one or more servers), intermediates between mobile device 380 and host vehicle 200. Prior to block 701, mobile device 200 knows: (a) a public key of backend 390, (b) vehicle metadata (an identity of host vehicle 200), (c) backend metadata, (e) mobile device metadata, (h) a mobile device private key, and (i) a mobile device/backend keypair [which is a private password].

Prior to block 701, backend 390 knows (b) the vehicle metadata, (c) the backend metadata (d) a vehicle security symmetric key, (e) the mobile device metadata, (f) the private key of backend 390, (g) a map of mobile device keypair (i) to (b) and/or (d), and (i) the private mobile device keypair. Prior to block 701, host vehicle 200 knows (c) the backend metadata and (d) vehicle security symmetric key [set at time of manufacturing].

The following table is provided for the reader's convenience:

TABLE 1

| | |
|---|---|
| a | public key of backend |
| b | vehicle metadata |
| c | backend metadata |
| d | vehicle security symmetric key |
| e | mobile device metadata |
| f | private key of backend |
| g | map (e.g., table) of multiple (i)s to multiple (b)s |
| h | mobile device private key |
| i | mobile device/backend keypair |

A process of generating and applying a new VAK will now be described in order. Mobile device 380 sends a new key request 701 to backend 390, which is a request for connectivity module 300 of host vehicle 200 to store a new VAK for mobile device 380. The new key request includes (b) and (i) individually encrypted according to (a). The new key request includes (e), which is unencrypted and thus enables routing of new key request 701 to backend 390. The new key request includes an unencrypted mobile device public key, which is based on (h).

Upon receiving new key request 701, backend 390 decrypts the message and confirms that (i) and (b) match via (g) the map (e.g., a table or spreadsheet). If the match is present, then backend 390 generates a VAK, the function (corresponding to r_ph and r_veh), and any hashing functions (previously discussed). Backend 390 individually encrypts the VAK and the functions according to (d) the vehicle security symmetric key associated with (b).

Key provision 702 includes the encrypted VAK, the encrypted functions, and unencrypted metadata. The unencrypted metadata enables main telematics module 320 to route key provision to connectivity module 300 at internal message 703 (which at least includes the VAK and the function individually encrypted according to (d)). Connectivity module 300 decrypts internal message 703 with (d), stores the VAK and stores one of the function as r_veh, stores the other functions as the hashing functions, and sends a response 704. The response 704 includes unencrypted metadata routing the message according to (c) and substantive data encrypted according to the VAK.

At 705, main telematics module 320 passes response 704 to backend 390 based on (c) the unencrypted metadata of backend 390. Upon receiving response 705, backend 390 transmits the VAK and the functions to mobile device 390 at 706. Upon receiving response 705, backend 390 may save the VAK and the functions and associate the same with the vehicle metadata. Alternatively, backend 390 may permanently delete the VAK and the functions.

In provision key message 706, the VAK and the functions are encrypted according to a mobile device public key, provided in as unencrypted data in new key request 701. Message 706 includes unencrypted mobile device metadata (e). Mobile device 380 decrypts message 706 with (h). Mobile device 380 stores the VAK, stores one of the functions as r_ph, and stores the other functions as the hashing functions. Mobile device 380 and host vehicle 200 may now execute steps 402 through 450 as discussed in FIGS. 5 and 6.

A process of revoking a VAK will now be described in order. Mobile device 380 issues a revoke key request 721, which is similar to new key request 701 (i.e., encrypted and transmitted according to the same techniques), but includes a revoke key command, instead of a new key command. Revoke key request 721 may include the encrypted VAK ID or the encrypted VAK.

Backend 390 receives the revoke key request 721, decrypts the VAK ID or VAK, and issues a revoke key command 722 (as above, if (i) maps to (b), which is similar to provision key message 702 (but includes a revoke key command and the encrypted VAK ID or the encrypted VAK). Main telematics 320 generates a revoke key internal message 723 based on 722. Connectivity module 300 decrypts the revoke key internal message, revokes the VAK, the function (r_veh), the hashing functions, and generates a response 724 (which is similar to response 724, but includes the encrypted VAK or VAK ID).

Main telematics module 320 forwards response 704 with response 705 to backend 390. Backend 930 decrypts response 705, marks the VAK and the function as revoked, and transmits a revoke key confirmation 726 to mobile device 380. Revoke key confirmation 726 is similar to the provision key message 706. Mobile device 380 decrypts revoke key confirmation 726 and revokes the VAK, the function (r_ph), and the hashing functions based on the decrypted VAK or VAK ID.

It should thus be appreciated that the following message pairs are similar (encrypted and routed according to the same techniques), but include different underlying substantive data either corresponding to a provision key command or a revoke key command: (i) messages 701 and 721, (ii) messages 702 and 722, (iii) messages 703 and 723, (iv) messages 704 and 724, (v) messages 705 and 725, (vi) messages 706 and 726. It should be appreciated that the following message pairs include at least the same encrypted data: (i) messages 702 and 703, (ii) messages 704 and 705, (iii) messages 722 and 723, (iv) messages 724 and 725.

Various items in this disclosure may be trademarked, including Bluetooth and Blu-Ray.

We claim:

1. A computing system comprising:
a main telematics module,
a connectivity module comprising antenna(s), processor(s), the connectivity module configured to:
   (a) authenticate a mobile device via a vehicle-access-key (VAK);
   (b), if (a), issue an ephemeral-session-key (DSK) to the mobile device;
   (c), if (b), establish an active session with the mobile device;
   (d) encrypt messages to the mobile device with the VAK during (a) and with the DSK during (c); and
   (e) maintain the active session with the mobile device only when a signed challenge message periodically transmitted by the connectivity module is satisfied with a signed response from the mobile device within a countdown, the countdown resetting each time the signed response is received from the mobile device.

2. The computing system of claim 1, wherein the connectivity module is configured to automatically revoke the DSK.

3. The computing system of claim 2, wherein the connectivity module is configured to automatically revoke the DSK upon expiration of a predetermined time interval.

4. The computing system of claim 3, wherein the time interval begins during (b).

5. The computing system of claim 4, wherein the connectivity module is configured to during (c), reject messages from the mobile device encrypted with the VAK but accept messages from another mobile device encrypted with a different VAK.

6. The computing system of claim 1, wherein the connectivity module is configured to begin (a) upon receiving an unencrypted message comprising a valid VAK ID and a valid VAK hash.

7. The computing system of claim 1, wherein the connectivity module is configured to include an unencrypted VAK authentication code in messages including VAK encrypted data.

8. The computing system of claim 7, wherein the connectivity module is configured to include an unencrypted DSK hash in messages including DSK encrypted data.

9. The computing system of claim 1, wherein the connectivity module is configured to break the DSK into a first block (DSK1) and a second block (DSK2).

10. The computing system of claim 9, wherein both of DSK1 and DSK2 are necessary to compute DSK.

11. The computing system of claim 9, wherein the connectivity module is configured to break the DSK by factoring the DSK such that DSK1 is a first factor and DSK2 is a second factor.

12. The computing system of claim 9, wherein the connectivity module is configured to transmit DSK1 in a first message and DSK2 in a later second message.

13. The computing system of claim 12, wherein the connectivity module is configured to transmit DSK2 in reply to a valid response from the mobile device.

14. The computing system of claim 13, wherein the connectivity module is configured to transmit an encrypted nonce to the mobile device.

15. The computing system of claim 14, wherein to be valid, the response must include a value based on the nonce.

16. The computing system of claim 15, wherein the connectivity module is configured to transmit DSK assembly instructions with DSK1 or DSK2.

17. The computing system of claim 16, wherein the connectivity module is configured to increment the nonce and transmit the incremented nonce to the mobile device prior to (c).

18. The computing system of claim 1, wherein the VAK is a first VAK, the DSK is a first DSK and the connectivity module is configured to store multiple VAKs and multiple DSKs.

19. The computing system of claim 1, wherein the connectivity module is configured to revoke the DSK upon receiving a message from the mobile device encrypted with the VAK during (c).

20. The computing system of claim 1, wherein the connectivity module is configured to include unencrypted mobile device metadata in each message to the mobile device, the metadata enabling the mobile device to route the message.

* * * * *